US008170031B2

(12) United States Patent
Sundaresan

(10) Patent No.: US 8,170,031 B2
(45) Date of Patent: May 1, 2012

(54) HIGH PERFORMANCE SCHEDULING METHODS AND APPARATUS FOR LEVERAGING DIVERSITY IN RELAY-ENABLED WIRELESS NETWORKS

(75) Inventor: Karthikeyan Sundaresan, Monmouth Junction, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 591 days.

(21) Appl. No.: 12/277,086

(22) Filed: Nov. 24, 2008

(65) Prior Publication Data

US 2009/0135777 A1   May 28, 2009

Related U.S. Application Data

(60) Provisional application No. 60/990,384, filed on Nov. 27, 2007.

(51) Int. Cl.
*H04L 12/28* (2006.01)
*H04W 4/00* (2009.01)

(52) U.S. Cl. ............... 370/395.4; 370/328; 370/338

(58) Field of Classification Search ............ 370/252, 370/328, 338, 395.4
See application file for complete search history.

(56) References Cited

U.S. PATENT DOCUMENTS

| | | | | |
|---|---|---|---|---|
| 6,331,974 B1* | 12/2001 | Yang et al. | | 370/342 |
| 2007/0042782 A1* | 2/2007 | Lee et al. | | 455/450 |
| 2007/0166014 A1* | 7/2007 | Schwarzmann | | 386/125 |
| 2008/0273515 A1* | 11/2008 | Stopler et al. | | 370/344 |
| 2008/0317104 A1* | 12/2008 | Akcaba et al. | | 375/211 |
| 2009/0147790 A1* | 6/2009 | Kang et al. | | 370/395.4 |

* cited by examiner

*Primary Examiner* — Warner Wong
(74) *Attorney, Agent, or Firm* — Joseph Kolodka; Jeffery Brosemer

(57) ABSTRACT

Apparatus and methods are described for scheduling transmission resources in a relay-enabled orthogonal frequency-division multiple access (OFDMA) wireless communications system. Schedulers are described which address the problem of determining the optimal transmission schedule across two hops in the presence of finite user buffers with methods that provide approximate solutions with worst-case performance guarantees and average-case performance that is close to the optimal. The solutions formulate the diversity scheduling problem as an integer program. The weights used in the formulation incorporate the various diversity gains. The integer program is relaxed to a linear program and solved. The resulting fractional solutions are then rounded to integral values. In the process, if buffer or channel feasibility is violated, such violations are addressed through appropriate mechanisms that provide performance guarantees. The relay hop fractional variables are rounded to integral values first. Then the access hop flow is updated based on the rounded relay hop flow. Finally, the access hop variables are rounded to integral values to provide the resulting flow schedule.

7 Claims, 4 Drawing Sheets

HIGH PERFORMANCE SCHEDULING METHODS AND APPARATUS FOR LEVERAGING DIVERSITY IN RELAY-ENABLED WIRELESS NETWORKS

RELATED PATENT APPLICATIONS

The present application claims priority from U.S. Provisional Patent Application No. 60/990,384, filed on Nov. 27, 2007, which is incorporated herein by reference in its entirety.

FIELD OF THE INVENTION

The present invention relates to the field of wireless communications, and more particularly to relay-assisted cellular communications networks.

BACKGROUND INFORMATION

There has been an increasing demand to provide ubiquitous mobile access for a multitude of services ranging from conventional data to real-time streaming applications. To meet such requirements, existing cellular systems need to be enhanced to provide improved data rates and connectivity.

Adding less sophisticated and less expensive "relay" stations (RS) to a network helps improve the throughput and coverage in the network. The introduction of relay stations transforms the network into a two-hop network, which is not as complex as a multi-hop network but at the same time not as straight-forward as a cellular network, thereby allowing for unique optimizations. Such two-hop networks not only provide multi-user and channel diversity gains available in conventional one-hop orthogonal frequency-division multiple access (OFDMA) cellular systems, but also provide cooperative diversity gains due to the presence of relays. Furthermore, in addition to diversity within hops, two-hop networks also provide diversity gains across hops.

Scheduling is an important component in the efficient exploitation of the diversity gains delivered by two-hop relay-assisted cellular networks. Known approaches leverage only the multi-user and channel diversity gains available in one-hop cellular networks. (See Z. Zhang et al., "Opportunistic downlink scheduling for multiuser OFDM systems," IEEE WCNC, March 2005; and G. Song et al., "Cross-layer optimization for OFDM wireless networks—Part I: Theoretical Framework," IEEE Transactions on Wireless Communications, vol. 4, no. 2, March 2005.) Approaches that consider relay cooperation focus on the design of cooperation strategies but do not provide efficient scheduling algorithms that are capable of leveraging these cooperative gains, when made available. (See A. So et al., "Effect of relaying on capacity improvement in wireless local area networks," in IEEE WCNC, March 2005; and P. Herhold et al., "Relaying in cdma networks: pathloss reduction and transmit power savings," in IEEE VTC, April 2003.) On the other hand, approaches that consider scheduling in relay networks do not leverage diversity across hops. (See S. Mengesha et al., "Relay routing and scheduling for capacity improvement in cellular wlans," in WiOpt: Modeling and Optimization in Mobile, Ad-hoc and Wireless Networks," March 2003; and N. Challa et al., "Cost-aware downlink scheduling of shared channels for cellular networks with relays," IEEE International Conference on Performance Computing and Communications, 2004.)

Furthermore, known scheduling solutions do not incorporate finite data in user buffers and instead assume backlogged data. In fact, data in user buffers is limited in practice and incorporation of this aspect changes the problem considerably, making it more difficult. The problem of determining the optimal diversity schedule across two hops in the presence of finite user buffers is an NP-hard problem, which is even hard to approximate and hence no optimal solution exists that runs in polynomial time.

The efficient exploitation of the diversity gains at the base station (BS) of a two-hop relay-assisted cellular network requires more sophisticated solutions than those currently available.

SUMMARY OF THE INVENTION

In an exemplary embodiment, the present invention provides methods and apparatus that improve the throughput performance of relay-assisted orthogonal frequency-division multiple access (OFDMA) cellular networks through the exploitation of diversity gains (e.g., multi-user, channel, spatial and cooperation) both within and across hops, while taking into account the finite data in user buffers.

In an exemplary embodiment, the present invention addresses the problem of determining the optimal diversity schedule across two hops in the presence of finite user buffers with methods that provide approximate solutions with worst-case performance guarantees and average-case performance that is close to the optimal. The solutions formulate the diversity scheduling problem as an integer program. The weights used in the formulation incorporate the various diversity gains. The integer program is relaxed to a linear program and solved. The resulting fractional solutions are then rounded to integral values. In doing so, however, buffer or channel feasibility may be violated. These violations are restored through appropriate mechanisms that provide performance guarantees. The relay hop fractional variables are rounded to integral values first. Then the access hop flow is updated based on the rounded relay hop flow. Finally, the access hop variables are rounded to integral values to provide the resulting flow schedule.

Other aspects, features and advantages of the present invention will be apparent from the detailed description of the invention and from the claims.

DETAILED DESCRIPTION

Figure 1:
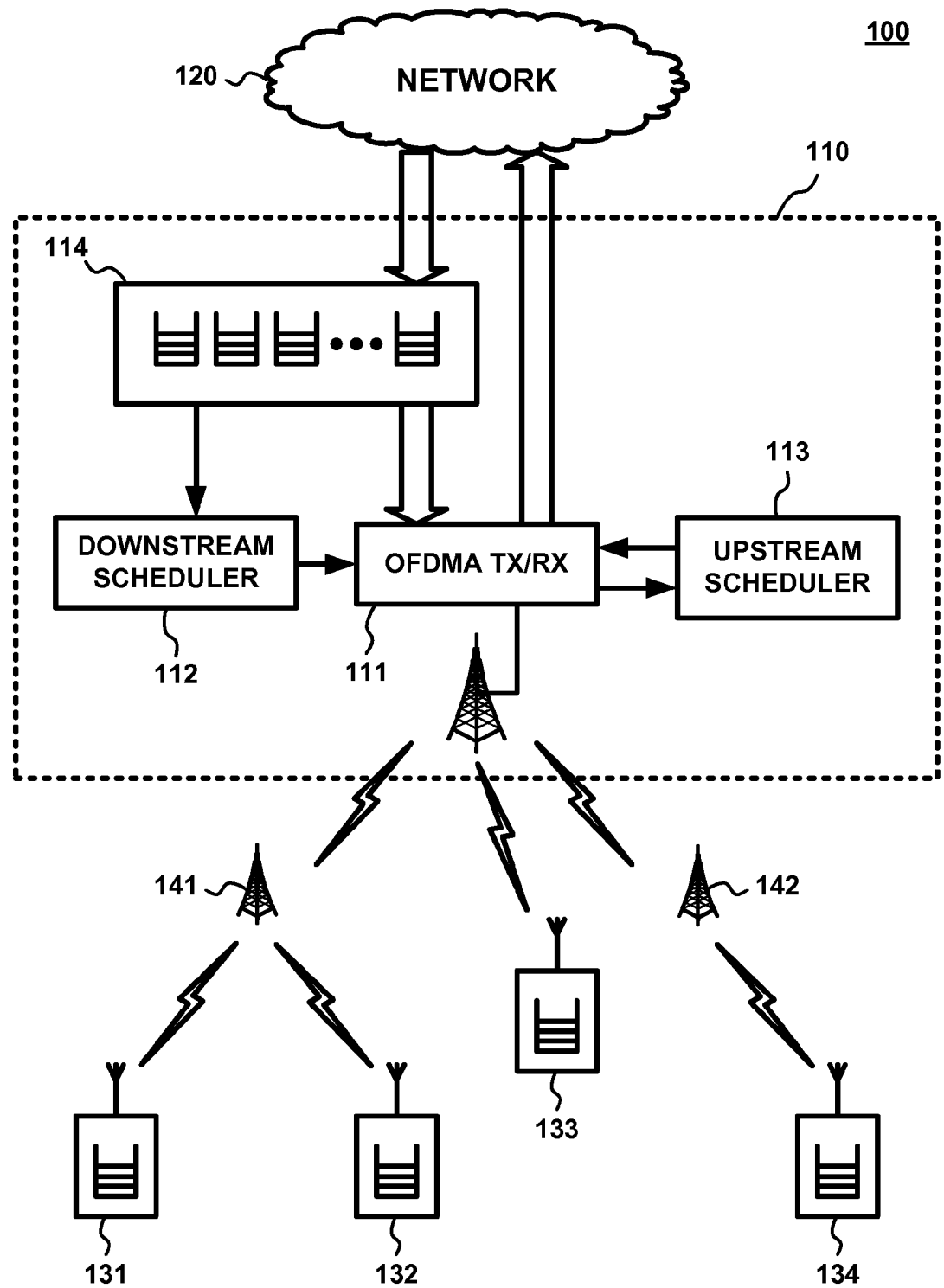
FIG. 1 is a schematic representation of an exemplary relay-enabled, two-hop wireless network.

FIG. 1 shows an exemplary relay-enabled, two-hop wireless communications system 100 for use with the present invention. A base station 110 coupled to a communications network 120 serves a plurality of mobile devices 131-134 distributed within an extended cell radius served by the base station 110 and a set of relay stations 141 and 142. The relay stations 141 and 142 communicate with the base station 110. Mobile devices may communicate with a relay station, as in the cases of devices 131 and 132 and relay station 141, or they may communicate directly with the base station 110, as in the case of device 133. The links between the base station 110 and a relay station 141, 142, are referred to as relay links, while those between a mobile device and a relay station are referred to as access links. Links between the base station and a mobile device are referred to as direct links.

The air interface technology is assumed to be orthogonal frequency-division multiple access (OFDMA), with the base station 110, relay stations 141, 142 and the mobile devices 131-134 allowed to operate on multiple channels from a set of N total sub-channels. Downstream data flows originate from the communications network 120, such as the Internet, and are destined towards the mobile devices 131-134 via the base station 110. In the base station 110, the downstream data flows for each mobile device are buffered at 114, before being forwarded to an OFDMA transceiver 111 for transmission to the relay stations 141, 142 and the devices 131-134. A downstream scheduler 112, implemented as described in greater detail below, monitors the state of the buffers 114 and determines a transmission schedule to be carried out by the OFDMA transceiver 111 in transmitting the data flows to their intended recipient devices.

Upstream data flows originate from the mobile devices 131-134 which are transmitted therefrom in accordance with a transmission schedule determined by an upstream scheduler 113. The upstream scheduler 113 operates according to the same principles as the downstream scheduler 112, so the description below applies to both. In the upstream case, however, each mobile device 131-134 maintains its own transmission buffer and transmits buffer status information to the base station 110, which the upstream scheduler 113 uses in determining the upstream transmission schedule. Moreover, the upstream transmission schedule is transmitted to the mobile devices 131-134 informing them of which channel(s) and/or time slots to use when transmitting. The exchange of buffer and transmission schedule information between the mobile devices 131-134 and base station 110 can be carried out in accordance with well-known procedures and protocols.

Figure 2:
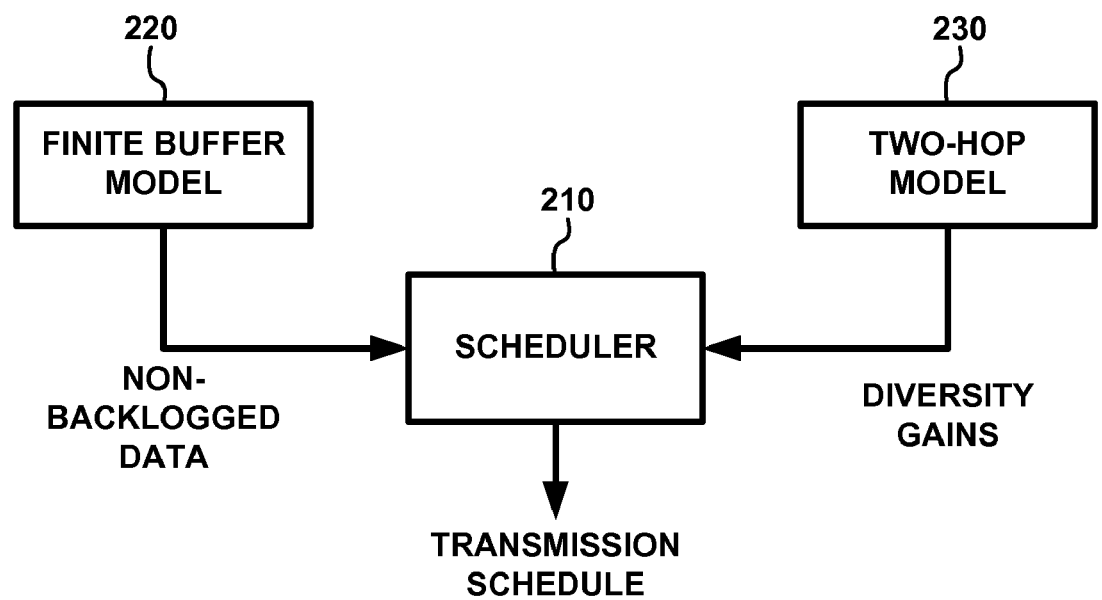
FIG. 2 is a schematic representation of an exemplary embodiment of a diversity scheduler in accordance with the present invention, illustrating the leveraging of the various diversity gains of a two-hop model while constrained by a finite user buffer model.

FIG. 2 is a schematic representation of a transmission scheduler 210 implemented in accordance with the present invention. The scheduler 210 can be used in the downstream or upstream direction, as described above. As represented, the scheduler 210 uses a finite transmission buffer model 220 and a two-hop model 230 to generate a transmission schedule. The finite transmission buffer model 220 assumes that the transmission buffers (whether downstream in the base station or upstream in the mobile devices) are finite in size. This imposes the constraint that data to be transmitted is not backlogged.

The two-hop model 230 used by the scheduler 210 entails taking into account a variety of diversity gains available in a two-hop arrangement such as that illustrated in FIG. 1. Such gains may include multi-user diversity gain, in which different users experience different channel conditions for a given channel and the best user or mobile device for a particular channel is selected; channel diversity gain, in which a given user experiences different channel conditions across channels and the best channel for a mobile device is selected; cooperation diversity gain, in which multiple nodes transmit similar data to a single receiver to improve received signal strength at the receiver; and spatial diversity gain, in which a given user on a given channel experiences different conditions on different hops and the best set of channels in the access and relay hops are selected for a particular mobile device.

Figure 3:
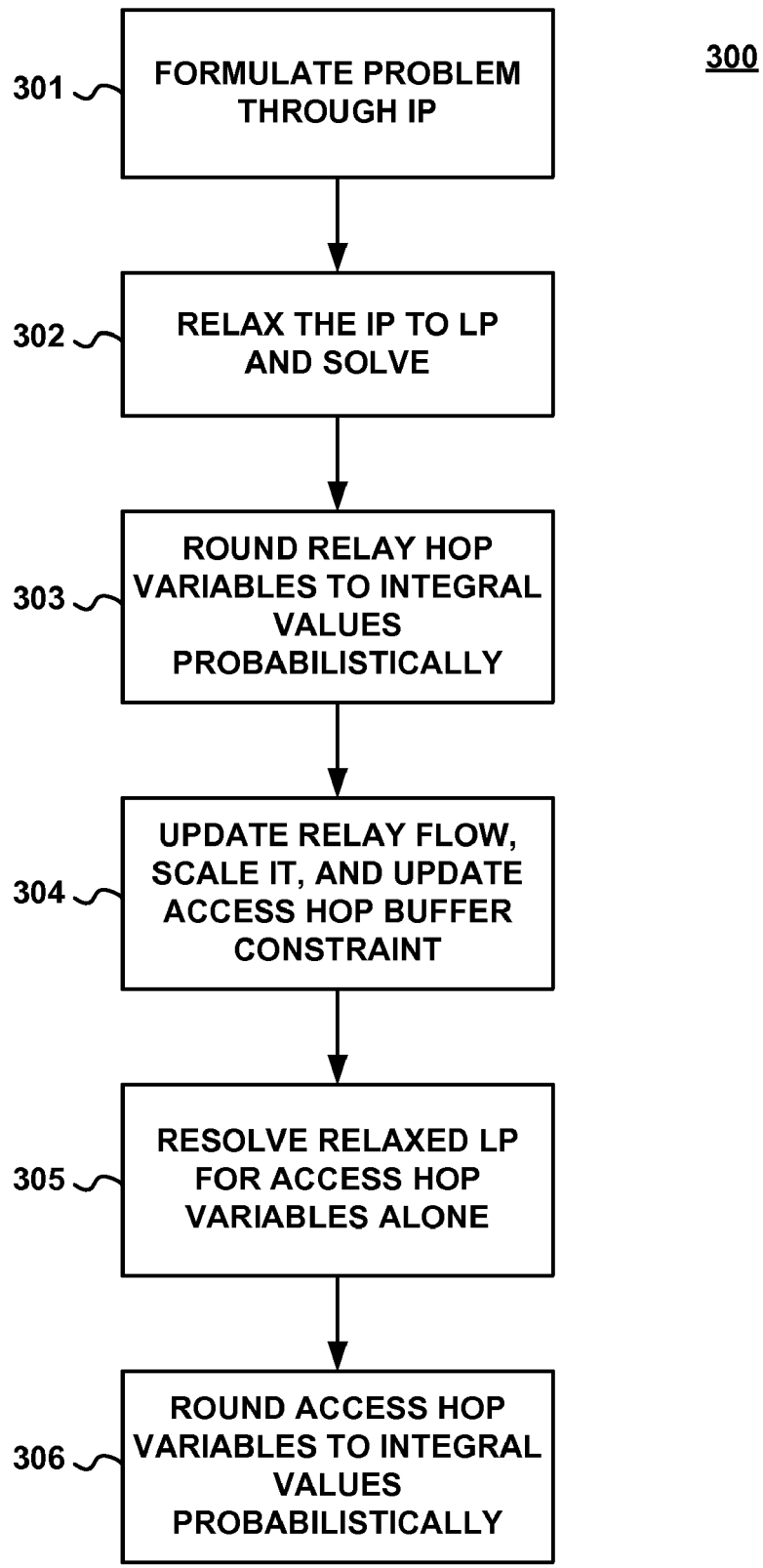
FIG. 3 is a flow chart of an exemplary embodiment of a diversity scheduler method in accordance with the present invention.

FIG. 3 is a flow chart of an exemplary embodiment of a scheduling method 300 in accordance with the present invention. The scheduling method 300 is carried out for each scheduling period, e.g., an OFDMA frame. The scheduling problem is first formulated as an integer program (IP) at 301. The formulation can be described with the following notations:

$a_k$: net data flow for user (or mobile device) 'k';
$x_{mk}$: indicator variable for user 'k' on relay channel 'm';
$y_{nk}$: indicator variable for user 'k' on access channel 'n';
$w_{mk}^r$: weight when relay channel 'm' is assigned to user 'k' (the weight or marginal utility of a user on a channel is the ratio of its instantaneous throughput on that channel to its average throughput);
$w_{nk}^a$: weight (marginal utility) when access channel 'n' is assigned to user 'k';
$C_a$: the set of channels on the access hop;
$C_r$: the set of channels on the relay hop;
U: the set of users (or mobile devices);
$B_k$: buffer size for user 'k';
$\beta_k$: quality of service (QoS) weight for user 'k';
$\bar{r}_k$: average throughput of user 'k'; and
T: the scheduling period (i.e., duration of OFDMA frame).

The objective function of maximizing the aggregate two-hop net data flow of the set of users can be expressed as follows:

$$\max \sum_{k \in U} a_k, \quad (1)$$

subject to:

$$\sum_{k \in U} x_{mk} \leq 1, \quad \forall m \in C_r, \quad (2)$$

$$\sum_{k \in U} y_{nk} \leq 1, \quad \forall n \in C_a, \quad (3)$$

$$\sum_{m \in C} w_{mk}^r x_{mk} = a_k, \quad \forall k \in U, \quad (4)$$

$$\sum_{n \in C_a} w_{nk}^a y_{nk} = a_k, \quad \forall k \in U, \quad (5)$$

$$a_k \leq \frac{\beta_k B_k}{\bar{r}_k T}, \quad \forall k \in U, \quad (6)$$

where:

$x_{mk}, y_{nk} \in \{0,1\}; a_k \geq 0; w_{mk}^r, w_{nk}^a \in [0,1], \forall m,n,k.$ (7)

The inequalities (2) and (3) are constraints allowing a relay or an access channel to be assigned to at most one user. Eqs. (4) and (5) represent flow conservation constraints and inequality (6) represents a finite buffer constraint.

At step 302, the integral values of $x_{mk}$ and $y_{nk}$ are relaxed to fractional values and the resulting linear program (LP) is solved.

At step 303, the fractional relay hop variables are rounded to integral values. In an exemplary embodiment, the rounding is performed probabilistically by using the fractional values of the relay hop variables as probabilities.

At step 304, the relay hop flow for each user is updated based on the integral relay hop variables and scaled by $$\frac{1}{1-\delta}.$$

The access hop flow for each user is then updated as the lesser of the finite buffer constraint (6) and the updated and scaled relay hop flow. In other words:

$$a_k \leq \min\left\{\frac{\beta_k B_k}{\bar{r}_k T}, \frac{\sum_{m \in C_r} w_{mk}^r \hat{x}_{mk}^r}{1-\delta}\right\}, \quad (8)$$

where:

$$\delta = \sqrt{\frac{2\log(2N)}{a_k^*}}, \quad (9)$$

N is the number of channels (on each of the access and relay hops, the same channels being used in both hops), and $a_k^*$ is the optimal solution of the net flow for user 'k' upon solving the LP.

At step 305, with the updated access flow constraint, the LP is resolved for the access hop variables alone.

At step 306, the resulting fractional access hop variables are rounded to integral values using their fractional values as probabilities. The integral value relay hop variables determined at step 303 and the integral value access hop variables determined at step 306 constitute the transmission schedule determined by the scheduling method 300 for the current scheduling period. The transmission schedule generated by the process 300 is then carried out by the base station. The process 300 is then repeated for the next scheduling period.

It should be noted that the exemplary scheduling method 300, in which the relay hop variables are rounded-off first and the access hop variables are then resolved accordingly, is intended for downstream scheduling. For upstream scheduling, a similar method is carried out but with the access hop variables being rounded-off first and the relay hop variables then being resolved accordingly. Furthermore, for one-hop cases, i.e., users directly linked to the base station, the direct links are treated as relay links in the above-described scheduling method.

Figure 4:
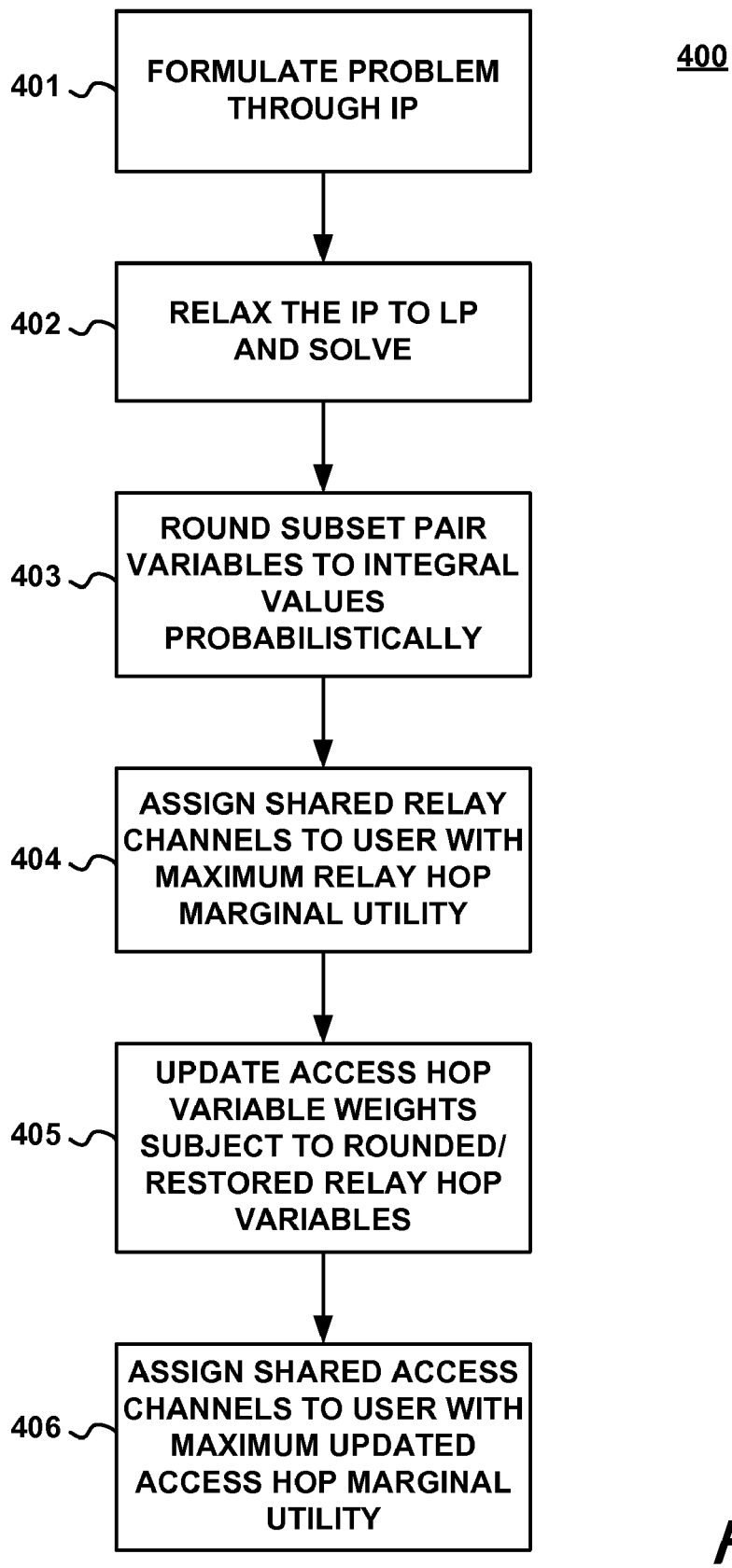
FIG. 4 is a flow chart of a further exemplary embodiment of a diversity scheduler method in accordance with the present invention.

The scheduling method 300 provides a level of performance that is guaranteed for a given number of users and channels. A further exemplary embodiment of a scheduling method in accordance with the present invention can provide a constant performance guarantee. FIG. 4 is a flow chart of such a scheduling method 400. The scheduling method 400 is carried out for each scheduling period, e.g., OFDMA frame. The scheduling problem is first formulated as an integer program (IP) at 401. The formulation can be described with the following notations:

s: subset pair (relay, access) subsets indicating set of channels assigned on the relay and access hops;

$Z_k^s = \{X_k^s, Y_k^s\}$: indicator variable for user 'k' being assigned subset pair 's';

$\hat{w}_k^s$: weight (marginal utility) when subset pair 's' is assigned to 'k', given by the minimum of the weights of the relay and access hop subsets, each of which is in turn given by the sum of the constituent channels;

c: set of channels on relay and access hops;

U: set of users; and $\bar{r}_k$: average throughput of user 'k'.

The objective function of maximizing the weights (flows) of the subset pair allocations can be expressed as follows:

$$\max \sum_{k \in U, s \in S_k} \hat{w}_k^s Z_k^s \quad (10)$$

subject to:

$$\sum_{k \in U, s \in S_k : c \in s} Z_k^s \leq 1, \quad \forall c \in [1, 2N], \quad (11)$$

$$\sum_{s \in S_k} Z_k^s = 1, \quad \forall k \in U, \quad (12)$$

$$Z_k^s \in \{0, 1\}; \quad \forall k \in U, s \in S_k. \quad (13)$$

Inequality (11) represents the channel constraint of each relay and access channel being assigned to at most one user. Equation (12) indicates subset pair feasibility indicating that only one subset pair can be assigned to a user. The buffer constraint is implicitly incorporated as follows: if a subset pair assigned to a user supports more data than that available in the user's buffer, then the rates on the channels in the subsets are scaled to ensure that they have a net weight that corresponds to the data in the buffer. This way, even if a subset pair would otherwise not be feasible, feasibility is ensured by scaling the weights (rates) of the constituent channels.

At step 402, the integral assignment variables are relaxed to fractional values and the resulting linear program (LP) is solved. The fractional solutions are:

$$Z_k^{s^*} = \{X_k^{s_r^*}, Y_k^{s_a^*}\}. \quad (14)$$

At step 403, the subset-pair assignment variables for each user are rounded with their fractional values as probabilities:

$$(X_k^{s_r}, Y_k^{s_a}) \rightarrow 1, \text{ with probability } Z_k^{s^*}. \quad (15)$$

Step 403, however, may yield a result which calls for a relay channel to be shared by multiple users. This is not allowed, in which case the conflict is resolved by assigning the channel to one user. At step 404, for each such shared relay channel, the channel is preferably assigned to the user with the largest relay flow (marginal utility):

$$k^* = \arg\max_{k: \hat{X}_k^{\hat{s}_r} = 1, m \in \hat{s}_r} \{\hat{w}_{mk}^{\hat{s}_r}\}. \quad (16)$$

At step 405, using the updated relay flow for each user, the weights of the subsets on the access hop are updated for each user:

$$\hat{w}_{nk}^{\hat{s}_a} = \hat{w}_{nk}^{\hat{s}_a}\left(\frac{\hat{w}_k^{\hat{s}_r}}{\hat{w}_k^*}\right). \quad (17)$$

At step 406, the updated weights are used to restore channel feasibility on the access hop:

$$k^* = \arg\max_{k: \hat{X}_k^{\hat{s}_a} = 1, n \in \hat{s}_a} \{\hat{w}_{nk}^{\hat{s}_a}\}. \quad (18)$$

The final subset-pairs assigned to each of the users after restoring (relay and access) channel feasibility will provide the transmission schedule for the relay and access hops. The transmission schedule generated by the process 400 is then carried out by the base station. The process 400 is then repeated for the next scheduling period.

The exemplary scheduling method 400, in which the relay hop variables are resolved first and the access hop variables are then resolved accordingly, is intended for downstream scheduling. For upstream scheduling, a similar method is carried out but with the access hop variables being resolved first and the relay hop variables then being resolved accordingly. Furthermore, for one-hop cases, i.e., users directly linked to the base station, the direct links are treated as relay links in the above-described scheduling method.

The above-described exemplary embodiments of schedulers and scheduling methods in accordance with the present invention deliver several benefits, including high performance and the ability to run in polynomial time, making them conducive for real-time implementation at a base station at the granularity of frames. Additionally, the exemplary embodiments of the present invention provide theoretical guarantees of achieving a worst-case performance within a factor of the optimal. The worst-case performance guarantee factor for the scheduling method 300, defined as the ratio that the scheduling method's performance is to that of the optimal, in the worst case, is $$1 - \sqrt{\frac{cK\log(2N)}{N}},$$

where K and N are the number of users and channels, respectively, in the system and c is a constant which captures the deviation in the marginal utilities of users. By way of illustration, in an exemplary embodiment with N=2,048, K=100 and c=1, the performance guarantee factor is approximately 0.37. In other words, the exemplary scheduling method 300 with these illustrative parameters has a performance that is 37% of that of the optimal solution in the worst case. The worst-case performance guarantee factor for the scheduling method 400, however, is 0.4. While the latter has a better performance guarantee, the former enjoys reduced running time complexity as compared to the latter.

It is understood that the above-described embodiments are illustrative of only a few of the possible applications of the present invention. Numerous and varied other arrangements can be made by those skilled in the art without departing from the spirit and scope of the present invention.

What is claimed is:

1. A method of scheduling transmission resources in a wireless communication system comprising:

configuring a base station for serving a plurality of mobile devices distributed within an extended cell radius served by said base station and a set of relay stations, said relay stations communicating with said base station and said mobile devices operable for communicating with said relay stations or with said base station directly; and determining a transmission schedule for communications between said base station and said mobile devices directly or through any of said relay stations by first formulating said transmission schedule as an integer process where an objective function of maximizing the aggregate two-hop net data flow of the set of users comprises a relationship:

$$\max \sum_{k \in U} a_k, \text{ subject to}: \sum_{k \in U} x_{mk} \leq 1, \forall m \in C_r, \sum_{k \in U} y_{nk} \leq 1, \forall n \in C_a,$$

$$\sum_{m \in C_r} w^r_{mk} x_{mk} = a_k, \forall k \in U, \sum_{n \in C_a} w^a_{nk} y_{nk} = a_k, \forall k \in U, a_k \leq \frac{\beta_k B_k}{\bar{r}_k T},$$

$$\forall k \in U, \text{ where } x_{mk}, y_{mk} \in \{0, 1\}; a_k \geq 0; w^r_{mk}, w^a_{nk} \in [0, 1], \forall m, n, k;$$

with $a_k$ being net data flow for user (or mobile device) 'k'; $x_{mk}$ being indicator variable for user 'k' on relay channel 'm'; $y_{nk}$ being indicator variable for user 'k' on access channel 'n'; $w_{mk}^r$ being weight when relay channel 'm' is assigned to user 'k' (the weight or marginal utility of a user on a channel is the ratio of its instantaneous throughput on that channel to its average throughput); $w_{nk}^a$ being weight (marginal utility) when access channel 'n' is assigned to user 'k'; $C_a$ being the set of channels on the access hop; $C_r$: the set of channels on the relay hop; U being the set of users (or mobile devices); $B_k$ being buffer size for user 'k'; $\beta_k$ being quality of service (QoS) weight for user 'k'; $\bar{r}_k$ being average throughput of user 'k'; and T being the scheduling period (i.e., duration of OFDMA frame).

2. The method of claim 1, wherein said determining comprises a relay hop flow for each user being updated based on integral relay hop variables and scaled by $$\frac{1}{1-\delta},$$

an access hop flow for each user being then updated as the lesser of the finite buffer constraint and the updated and scaled relay hop flow.

3. The method of claim 1, wherein said determining comprises $$a_k \leq \min\left\{\frac{\beta_k B_k}{\bar{r}_k T}, \frac{\sum_{m \in C_r} w^r_{mk} \hat{x}^r_{mk}}{1-\delta}\right\},$$

where:

$$\delta = \sqrt{\frac{2\log(2N)}{a_k^*}},$$

with N being the number of channels (on each of the access and relay hops, the same channels being used in both hops), and $a_k^*$ being the optimal solution of the net flow for user 'k' upon solving a linear programming LP, and a relay hop flow for each user is updated based on the integral relay hop variables and scaled by $$\frac{1}{1-\delta}.$$

4. The method of claim 1, wherein the two-hop diversity gains include at least one of a multi-user diversity gain, a sub-channel diversity gain, a cooperation diversity gain, and a spatial diversity gain.

5. The method of claim 1 characterized by a performance guarantee factor that decreases as the number of users increases and increases as the number of channels increases.

6. The method of claim 1 characterized by a performance guarantee factor that is a constant.

7. The method of claim 1, wherein said relationship is alternatively based on:

$$\max \sum_{k \in U, s \in S_k} \hat{w}_k^s Z_k^s, \text{ subject to } \sum_{k \in U, s \in S_k : c \in s} Z_k^s \leq 1, \forall c \in [1, 2N],$$

$$\sum_{s \in S_k} Z_k^s = 1, \forall k \in U, \text{ and } Z_k^s \in \{0, 1\}; \forall k \in U, s \in S_k,$$

with s being a subset pair (relay, access) subsets indicating set of channels assigned on the relay and access hops; $Z_k^s = \{X_k^s, Y_k^s\}$ being a indicator variable for user 'k' being assigned subset pair 's'; $\hat{w}_k^s$ being a weight (marginal utility) when subset pair 's' is assigned to 'k', given by the minimum of the weights of the relay and access hop subsets, each of which is in turn given by the sum of the constituent channels; c being a set of channels on relay and access hops; U being a set of users; and $\bar{r}_k$ being an average throughput of user 'k'.

\* \* \* \* \*